(12) United States Patent
Fan-Chiang et al.

(10) Patent No.: US 10,151,925 B2
(45) Date of Patent: Dec. 11, 2018

(54) HEAD-MOUNTED DISPLAY APPARATUS AND ASSOCIATED INTERNAL DISPLAY AND DISPLAY METHOD

(71) Applicant: Himax Display, Inc., Tainan (TW)

(72) Inventors: Kuan-Hsu Fan-Chiang, Tainan (TW); Biing-Seng Wu, Tainan (TW)

(73) Assignee: Himax Display, Inc., Tainan (TW)

( * ) Notice: Subject to any disclaimer, the term of this patent is extended or adjusted under 35 U.S.C. 154(b) by 0 days.

(21) Appl. No.: 15/397,752

(22) Filed: Jan. 4, 2017

(65) Prior Publication Data

US 2018/0031837 A1 Feb. 1, 2018

Related U.S. Application Data

(60) Provisional application No. 62/367,100, filed on Jul. 26, 2016.

(51) Int. Cl.
*G02B 27/01* (2006.01)
*F21V 8/00* (2006.01)

(52) U.S. Cl.
CPC ........ *G02B 27/0172* (2013.01); *G02B 6/0013* (2013.01); *G02B 2027/0123* (2013.01); *G02B 2027/0178* (2013.01)

(58) Field of Classification Search
CPC .............. G02B 27/0172; G02B 2027/0123
See application file for complete search history.

(56) References Cited

U.S. PATENT DOCUMENTS

| 8,837,880 | B2 * | 9/2014 | Takeda | G02B 6/0006 |
| | | | | 385/15 |
| 9,123,380 | B2 * | 9/2015 | Holtz | H04N 5/262 |
| 2004/0218243 | A1 | 11/2004 | Yamazaki | |
| 2006/0170615 | A1 | 8/2006 | Levola | |
| 2011/0234476 | A1 | 9/2011 | Sugihara | |
| 2012/0086625 | A1 | 4/2012 | Takeda | |
| 2015/0084850 | A1 | 3/2015 | Kim | |
| 2015/0378162 | A1 | 12/2015 | Bailey | |

FOREIGN PATENT DOCUMENTS

| CN | 102445754 A | 5/2012 |
| CN | 104076514 A | 10/2014 |
| JP | 2008-33352 A | 2/2008 |
| JP | 201283456 A | 4/2012 |
| JP | 2014103480 A | 6/2014 |
| KR | 10-2015-0034449 | 4/2015 |
| TW | 201215913 A1 | 4/2012 |
| WO | 2012/036933 A2 | 3/2012 |

\* cited by examiner

*Primary Examiner* — Andrew Sasinowski
(74) *Attorney, Agent, or Firm* — Winston Hsu

(57) ABSTRACT

A head-mounted display apparatus includes a display, a couple-in optics module and a couple-out optics module. The display is arranged for displaying at least an image. The couple-in optics module is arranged for receiving the image from the display and directing the received image to another direction. The couple-out optics module is arranged for receiving the directed image from the couple-in optics module to generate an output image directly to a human eye when a user wears the head-mounted display apparatus. In addition, an aspect ratio of the image generated from display is different from an aspect ratio of the output image.

16 Claims, 5 Drawing Sheets

HEAD-MOUNTED DISPLAY APPARATUS AND ASSOCIATED INTERNAL DISPLAY AND DISPLAY METHOD

CROSS REFERENCE TO RELATED APPLICATIONS

This application claims the priority of U.S. Provisional Application No. 62/367,100, filed on Jul. 26, 2016, which is included herein by reference in its entirety.

BACKGROUND OF THE INVENTION

1. Field of the Invention

The present invention relates to a head-mounted display apparatus, and more particularly, to an internal display and optics module designs within the head-mounted display apparatus.

2. Description of the Prior Art

A conventional head-mounted display generally comprises an exit pupil expander (EPE) to increase a size of an exit display pupil, where the exit pupil expander can be implemented by a micro-prism combiner, a cascaded coated mirror combiner, a volume holographic combiner or any other suitable optical elements. Generally, the EPE is only allowed to enlarge a horizontal field of view (FOV), so the head-mounted display needs another lens or lens module to enlarge a vertical FOV to keep the correct aspect ratio of the image. However, the lens or lens module increases the overall volume and weight of the head-mounted display, causing an inconvenience to a user.

SUMMARY OF THE INVENTION

It is therefore an objective of the present invention to provide a head-mounted display apparatus, whose internal display may generates an image having a special aspect ratio and no or less lenses is used for enlarging the vertical FOV, to solve the above-mentioned problem.

According to one embodiment of the present invention, a head-mounted display apparatus includes a display, a couple-in optics module and a couple-out optics module. The display is arranged for displaying at least an image. The couple-in optics module is arranged for receiving the image from the display and directing the received image to another direction. The couple-out optics module is arranged for receiving the directed image from the couple-in optics module to generate an output image directly to a human eye when a user wears the head-mounted display apparatus. In addition, an aspect ratio of a pixel or a sub-pixel within the image generated from display is different from an aspect ratio of a pixel or a sub-pixel within the output image.

According to another embodiment of the present invention, a display applied in a head-mounted display apparatus is disclosed, wherein the display comprises a plurality of pixels for displaying an image, and the head-mounted display apparatus comprises optics modules for receiving an image to generate an output image, and an aspect ratio of each of the pixels of the display is different from an aspect ratio of a pixel within the output image.

According to another embodiment of the present invention, a method for showing an output image within a head-mounted display apparatus is disclosed, and the method comprises: receiving an image from a display within a display positioned within the head-mounted display apparatus; directing the received image to another direction; and enlarging the directed image to generate the output image directly to a human eye when a user wears the head-mounted display apparatus; wherein an aspect ratio of a pixel or a sub-pixel within the image generated from display is different from an aspect ratio of a pixel or a sub-pixel within the output image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
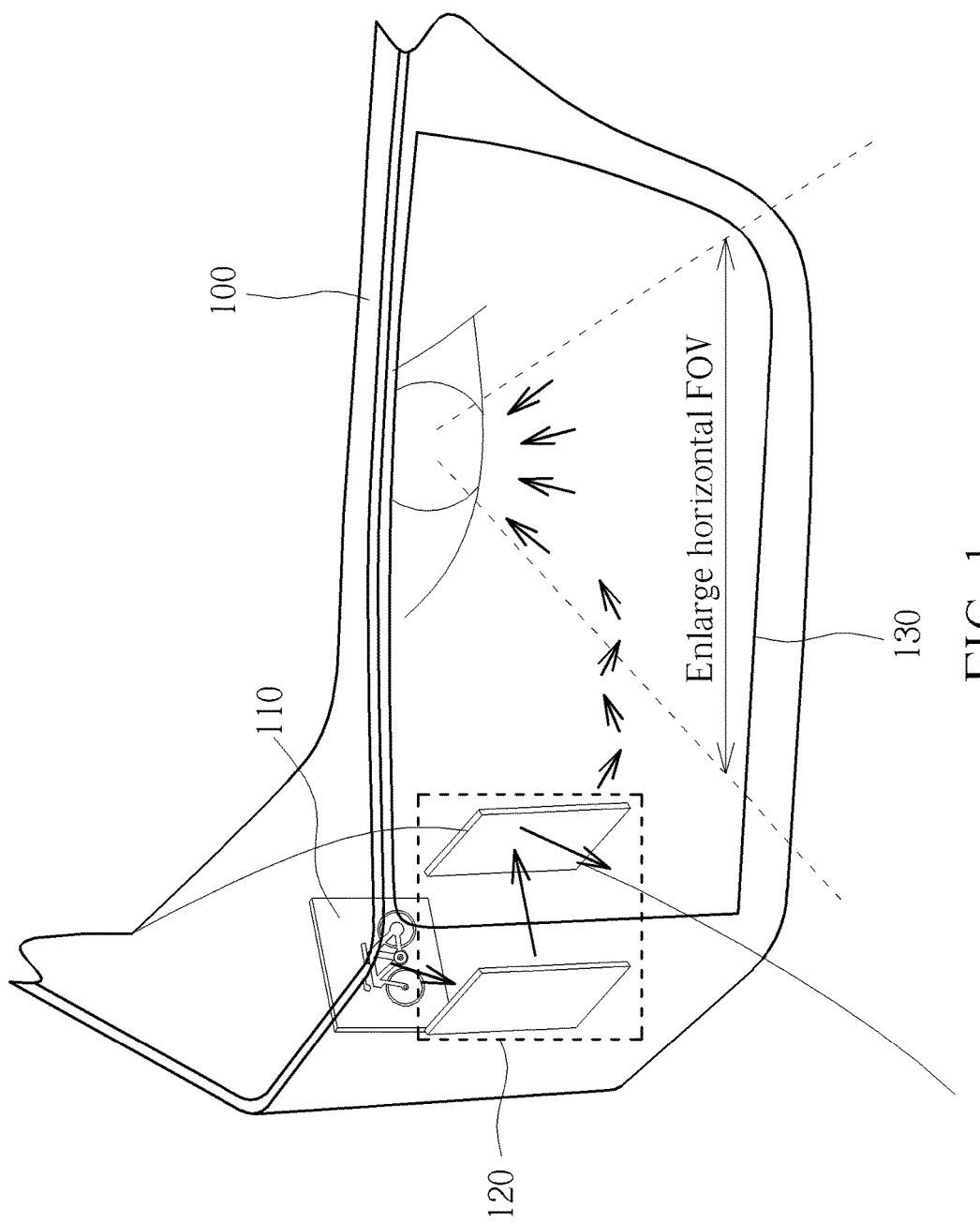
FIG. 1 is a diagram illustrating a head-mounted display apparatus according to one embodiment of the present invention.

Please refer to FIG. 1, which is a diagram illustrating a head-mounted display apparatus 100 according to one embodiment of the present invention. As shown in FIG. 1, the head-mounted display apparatus 100 comprises a display 110, a couple-in optics module 120 and a couple-out optics module 130. The display 110 can be any type of microdisplay capable of being positioned in the head-mounted display apparatus 100, for example the display 110 may be a liquid crystal on silicon (LCOS) display, a micro-electro-mechanical system (MEMS) display or an organic light-emitting diode (OLED) display. The couple-in optics module 120 may have one or more optical elements for receiving the images from the display and directing the received images to another direction, for example, the couple-in optics module 120 may have one or more reflectors. The couple-out optics module 130 serves as an EPE that may be implemented by a micro-prism combiner, a cascaded coated mirror combiner, a volume holographic combiner for receiving the directed image from the couple-in optics module 120 to generate an output image directly to a human eye when a user wears the head-mounted display apparatus 100 (the couple-out optics module 130 is in front of the human eye).

In this embodiment, the couple-in optics module 120 does not have any lens or lens module for enlarging the FOV only at a particular direction to lower the weight of the head-mounted display apparatus 100 and to reduce the size of the head-mounted display apparatus 100, that is an aspect ratio of the image (or an aspect ratio of a pixel or a sub-pixel within the image) generated by the display 110 is the same as an aspect ratio of the directed image (or an aspect ratio of a pixel or a sub-pixel within the directed image) generated by the couple-in optics module 120. As mentioned in the section "Description of the Prior Art", however, the EPE (i.e. the couple-out optics module 130) is only allowed to enlarge a horizontal FOV, that is the aspect ratio of the output image (or an aspect ratio of a pixel or a sub-pixel within the output image) is different from the aspect ratio of the directed image (or the aspect ratio of the pixel or the sub-pixel within the directed image) generated by the couple-in optics module 120. Therefore, to make the user capable of seeing the output images having a designated aspect ratio, such as 16:9 or 4:3, the display 110 has a special design to make the aspect ratio of image/pixel be much different from the aspect ratio of the designated aspect ratio.

For example, if the designated aspect ratio of the output image is 16:9, and the couple-out optics module 130 only doubles the horizontal FOV of the directed image (i.e. the aspect ratio of each pixel within the directed image is doubled) while the couple-in optics module 120 does not change the vertical FOV or the aspect ratio of the image, the image generated by the display 110 can be designed to have the aspect ratio 8:9.

In the aforementioned embodiment, the couple-in optics module 120 does not have any lens or lens module to change the aspect ratio of the image/pixel. In other embodiments, however, the couple-in optics module 120 may have less optical elements to enlarge a portion of vertical FOV. For example, if the designated aspect ratio of the output image is 16:9, and the couple-out optics module 130 only triples the horizontal FOV of the directed image while the couple-in optics module 120 only double the vertical FOV of the image, the display 110 can be designed to generate the image having the aspect ratio 8:9.

In light of above, the combination of the couple-in optics module 120 and the couple-out optics module 130 enlarges the image generated by the display 110 in an asymmetric manner (i.e. an enlargement ratio corresponding to a vertical direction of the image is different from an enlargement ratio corresponding to a horizontal direction of the image) to avoid the use of the lens or to reduce the lens amount within the couple-in optics module 120, and the aspect ratio of the image generated by the display is determined according to the designated aspect ratio and enlargement ratios of the optics modules. Therefore, the embodiments of the present invention can reduce the size and weight of the head-mounted display apparatus 100 while making the output image has the designated aspect ratio.

Figure 2:
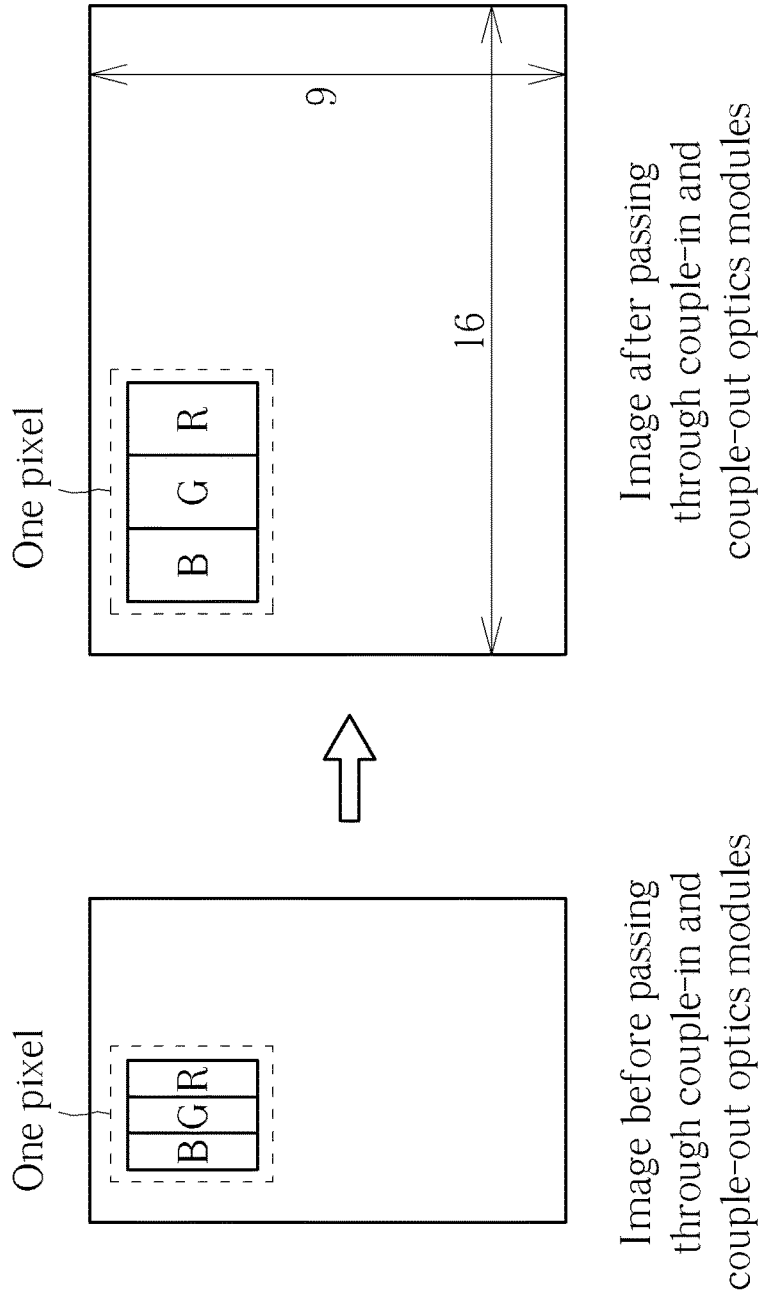
FIG. 2 is a diagram illustrating an image before passing through the couple-in optics module and the couple-out optics module and the image after passing through the couple-in optics module and the couple-out optics module according to one embodiment of the present invention.

Please refer to FIG. 2, which is a diagram illustrating an image before passing through the couple-in optics module 120 and the couple-out optics module 130 and the image (output image) after passing through the couple-in optics module 120 and the couple-out optics module 130 according to one embodiment of the present invention. As shown in FIG. 2, a pixel within the image comprises a red sub-pixel (R), a green sub-pixel (G) and a blue sub-pixel (B) positioned horizontally, and before the image passes through the couple-out optics module 130 (i.e. the image generated by the display 110 or the directed image generated by the couple-in optics module 120), the pixel or the sub-pixel has a narrower horizontal width, for example a size of the sub-pixel may be 2 um*7 um. Then, after the image passes through the couple-out optics module 130, each of the pixels is enlarged as the horizontal direction to make the output image have the designated aspect ratio such as 16:9.

Figure 3:
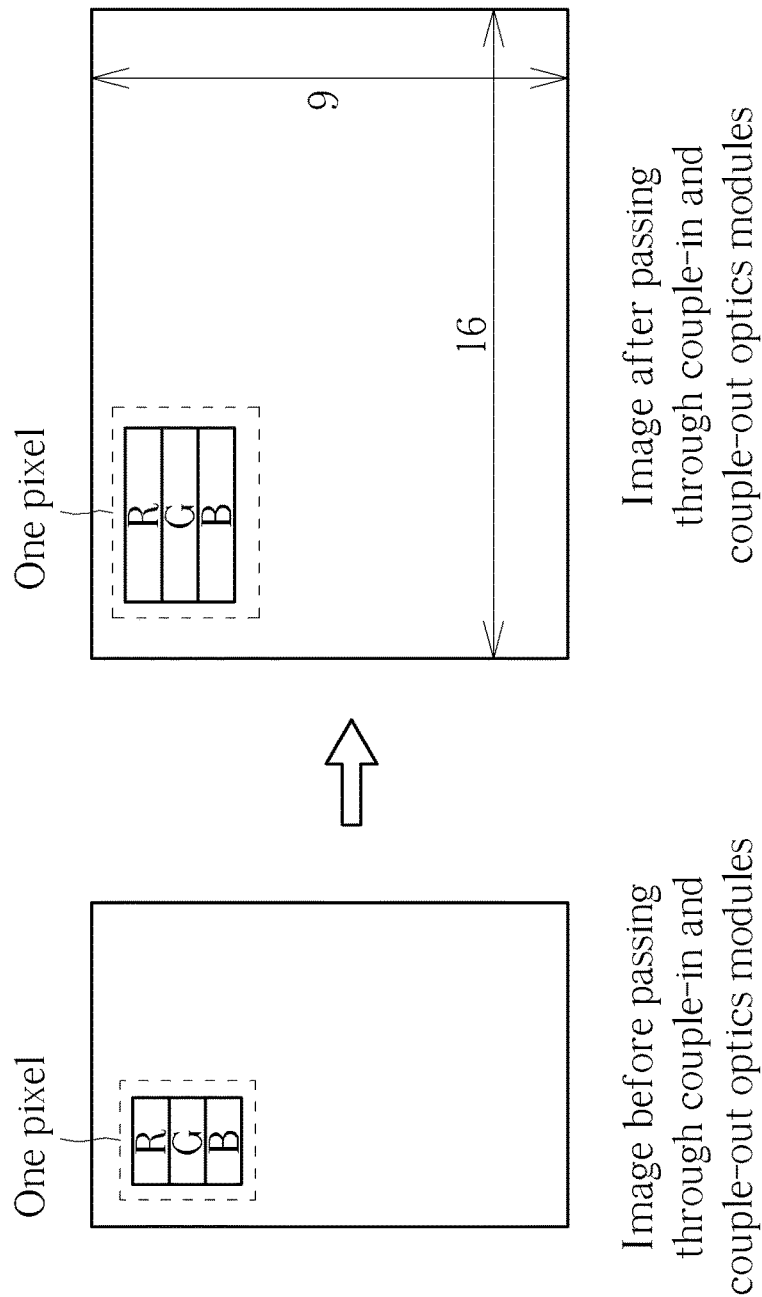
FIG. 3 is a diagram illustrating an image before passing through the couple-in optics module and the couple-out optics module and the image after passing through the couple-in optics module and the couple-out optics module according to another embodiment of the present invention.

Please refer to FIG. 3, which is a diagram illustrating an image before passing through the couple-in optics module 120 and the couple-out optics module 130 and the image (output image) after passing through the couple-in optics module 120 and the couple-out optics module 130 according to another embodiment of the present invention. As shown in FIG. 3, a pixel within the image comprises a red sub-pixel (R), a green sub-pixel (G) and a blue sub-pixel (B) positioned vertically, and before the image passes through the couple-out optics module 130 (i.e. the image generated by the display 110 or the directed image generated by the couple-in optics module 120), the pixel or the sub-pixel has a narrower horizontal width. Then, after the image passes through the couple-out optics module 130, each of the pixels is enlarged as the horizontal direction to make the output image have the designated aspect ratio such as 16:9.

Figure 4:
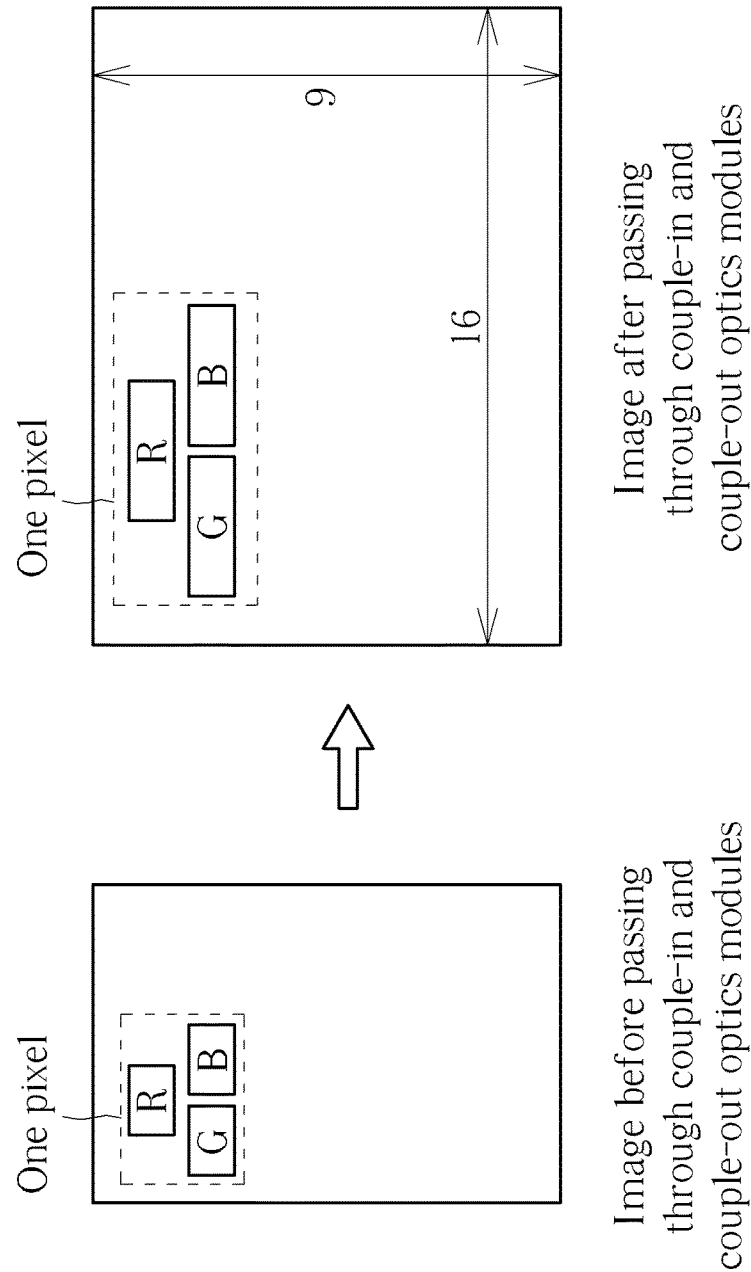
FIG. 4 is a diagram illustrating an image before passing through the couple-in optics module and the couple-out optics module and the image after passing through the couple-in optics module and the couple-out optics module according to another embodiment of the present invention.

Please refer to FIG. 4, which is a diagram illustrating an image before passing through the couple-in optics module 120 and the couple-out optics module 130 and the image (output image) after passing through the couple-in optics module 120 and the couple-out optics module 130 according to another embodiment of the present invention. As shown in FIG. 4, a pixel within the image comprises a red sub-pixel (R), a green sub-pixel (G) and a blue sub-pixel (B) positioned in a mosaic manner, and before the image passes through the couple-out optics module 130 (i.e. the image generated by the display 110 or the directed image generated by the couple-in optics module 120), the pixel or the sub-pixel has a narrower horizontal width. Then, after the image passes through the couple-out optics module 130, each of the pixels is enlarged as the horizontal direction to make the output image have the designated aspect ratio such as 16:9.

Figure 5:
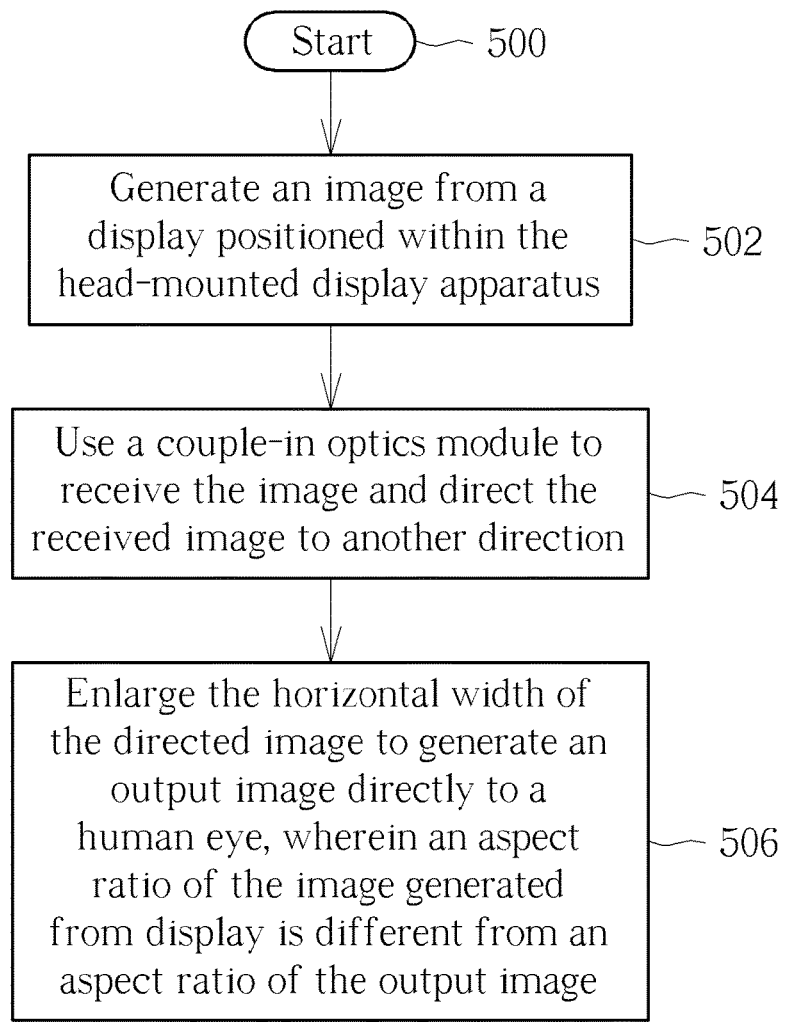
FIG. 5 is a flow of a method for showing an output image within a head-mounted display apparatus according to one embodiment of the present invention.

FIG. 5 is a flow of a method for showing an output image within a head-mounted display apparatus according to one embodiment of the present invention. Refer to the FIGS. 1-5 together, the flow is described as follows.

Step 500: the flow starts.

Step 502: generate an image from a display positioned within the head-mounted display apparatus.

Step 504: use a couple-in optics module to receive the image and direct the received image to another direction.

Step 506: enlarge the horizontal width of the directed image to generate an output image directly to a human eye, wherein an aspect ratio of the image generated from display is different from an aspect ratio of the output image.

Briefly summarized, in the head-mounted display apparatus of the present invention, by using the display whose image/pixels have a special aspect ratio, the optics module can enlarge the image generated by the display in an asymmetric manner to avoid the use of the lens or to reduce the lens amount within the optics module. Therefore, the embodiments of the present invention can reduce the size and weight of the head-mounted display apparatus while making the output image has the designated aspect ratio.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A head-mounted display apparatus, comprising:
   a display, for displaying at least an image;
   a couple-in optics module, for receiving the image from the display and directing the received image to another direction;
   a couple-out optics module, for receiving the directed image from the couple-in optics module to generate an output image directly to a human eye, without passing through any other optics element, when a user wears the head-mounted display apparatus;

wherein an aspect ratio of the image generated from display is different from an aspect ratio of the output image, and an aspect ratio of the directed image is different from the aspect ratio of the output image.

2. The head-mounted display apparatus of claim 1, wherein an aspect ratio of the directed image generated by the couple-in optics module is the same as the aspect ratio of the image displayed by the display.

3. The head-mounted display apparatus of claim 1, wherein the couple-out optics module only enlarges a field of view (FOV) of a first direction of the directed image, and the couple-in optics module does not enlarge a FOV of the second direction of the image, wherein the second direction is different from the first direction.

4. The head-mounted display apparatus of claim 3, wherein the couple-out optics module only enlarges a horizontal FOV of the directed image, and the couple-in optics module does not enlarge a vertical FOV of the image.

5. The head-mounted display apparatus of claim 3, wherein the couple-in optics module does not have any lens or lens module for changing the aspect ratio of the image.

6. The head-mounted display apparatus of claim 3, wherein an aspect ratio of the directed image generated by the couple-in optics module is the same as the aspect ratio of the image displayed by the display.

7. The head-mounted display apparatus of claim 3, wherein the aspect ratio of the output image is 16:9 or 4:3.

8. The head-mounted display apparatus of claim 1, wherein the couple-in optics module comprises at least a reflector to direct the received image to the another direction.

9. The head-mounted display apparatus of claim 1, wherein the couple-out optics module is in front of the human eye when the user wears the head-mounted display apparatus, and the output image is generated in front of the human eye.

10. A method for showing an output image within a head-mounted display apparatus, comprising:

receiving an image from a display within a display positioned within the head-mounted display apparatus;

directing the received image to another direction; and using a couple-out optics module to enlarge enlarging the directed image to generate the output image directly to a human eye, without passing through any other optics element, when a user wears the head-mounted display apparatus;

wherein an aspect ratio of the image generated from display is different from an aspect ratio of the output image, and an aspect ratio of the directed image is different from the aspect ratio of the output image.

11. The method of claim 10, wherein an aspect ratio of the directed image is the same as the aspect ratio of the image displayed by the display.

12. The method of claim 10, wherein the step of enlarging the directed image to generate the output image comprises:

only enlarging a field of view (FOV) of a first direction of the directed image; and the step of directing the received image to another direction comprises:

not enlarging a FOV of a second direction of the image, wherein the second direction is different from the first direction.

13. The method of claim 12, wherein the step of enlarging the directed image to generate the output image comprises:

only enlarging a horizontal FOV of the directed image; and the step of directing the received image to another direction comprises:

not enlarging a vertical FOV of the image.

14. The method of claim 12, wherein the step of directing the received image to another direction is performed by a couple-in optics module, and the couple-in optics module does not have any lens or lens module for changing the aspect ratio of the image.

15. The method of claim 12, wherein an aspect ratio of the directed image is the same as the aspect ratio of the image displayed by the display.

16. The method of claim 12, wherein the aspect ratio of the output image is 16:9 or 4:3.

\* \* \* \* \*